Figures 1A, 2:
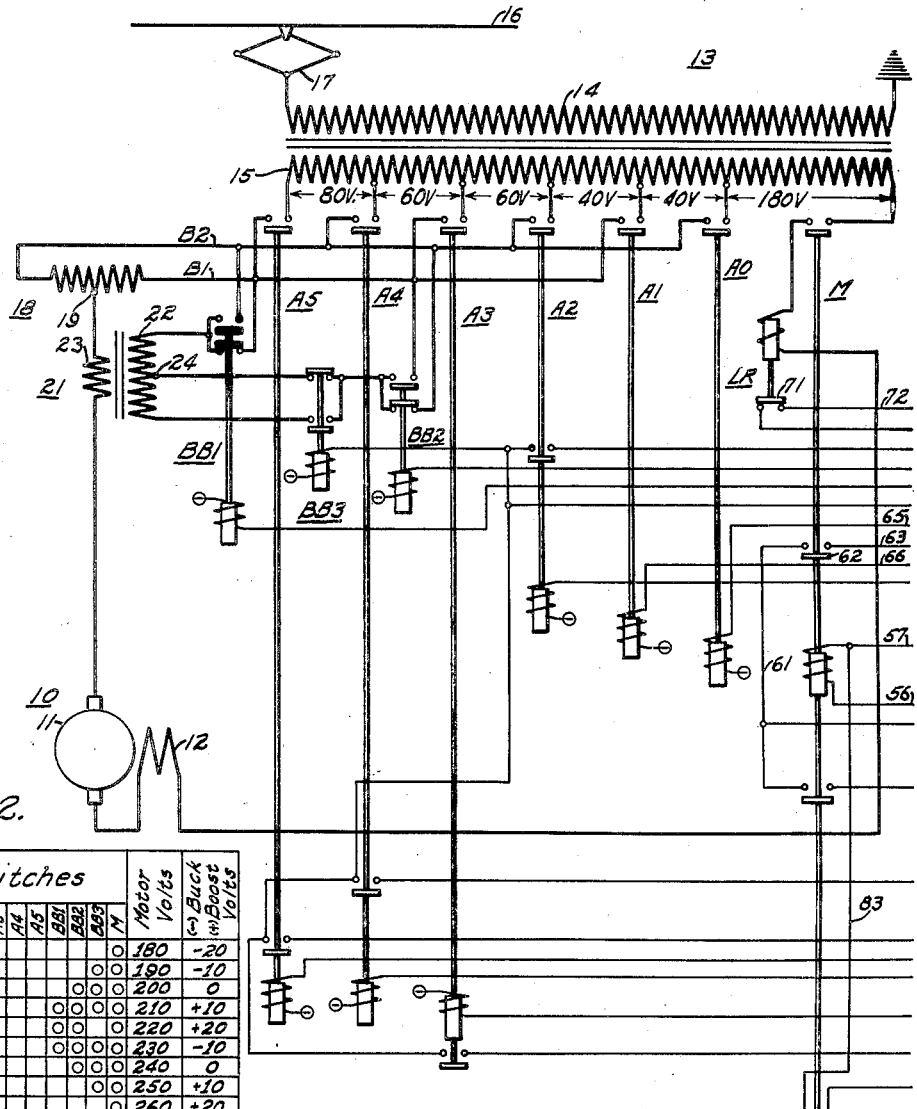

May 7, 1940.  L. J. HIBBARD ET AL  2,200,083
CONTROL SYSTEM
Filed Jan. 31, 1939   2 Sheets-Sheet 1

| Controller Step | Switches | | | | | | | | | Motor Volts | (−)Buck (+)Boost Volts |
|---|---|---|---|---|---|---|---|---|---|---|---|
| | A0 | A1 | A2 | A3 | A4 | A5 | BB1 | BB2 | BB3 | M | |
| a 1 | O | O | | | | | | | O | O | 180 | −20 |
| 2 | O | O | | | | | | O | | O | 190 | −10 |
| 3 | O | O | | | | | O | | | O | 200 | 0 |
| 4 | O | O | | | | | | O | | O | 210 | +10 |
| 5 | O | O | | | | | | | O | O | 220 | +20 |
| b 6 | | O | O | | | | | | O | O | 230 | −10 |
| 7 | | O | O | | | | O | | | O | 240 | 0 |
| 8 | | O | O | | | | | O | | O | 250 | +10 |
| 9 | | O | O | | | | | | O | O | 260 | +20 |
| 10 | | | O | O | | | | | O | O | 275 | −15 |
| 11 | | | O | O | | | O | | | O | 290 | 0 |
| 12 | | | O | O | | | | O | | O | 305 | +15 |
| 13 | | | O | O | | | | | O | O | 320 | +30 |
| 14 | | | | O | O | | | | O | O | 335 | −15 |
| 15 | | | | O | O | | O | | | O | 350 | 0 |
| 16 | | | | O | O | | | O | | O | 365 | +15 |
| c 17 | | | | O | O | | | | O | O | 380 | +30 |
| 18 | | | | | O | O | | | O | O | 400 | −20 |
| 19 | | | | | O | O | O | | | O | 420 | 0 |
| 20 | | | | | O | O | | O | | O | 440 | +20 |
| 21 | | | | | O | O | | | O | O | 460 | +40 |

WITNESSES:
Leon M. Garman
(signature)

INVENTORS
Lloyd J. Hibbard and
Thelbert L. Weybrew
BY (signature)
ATTORNEY

Patented May 7, 1940

2,200,083

UNITED STATES PATENT OFFICE 2,200,083

CONTROL SYSTEM

Lloyd J. Hibbard, Forest Hills, and Thelbert L. Weybrew, Edgewood, Pa., assignors to Westinghouse Electric & Manufacturing Company, East Pittsburgh, Pa., a corporation of Pennsylvania Application January 31, 1939, Serial No. 253,794

12 Claims. (Cl. 172—179)

Our invention relates, generally, to control systems and, more particularly, to systems for controlling the operation of vehicles which are driven by electric motors.

It is the usual practice to accelerate an electric vehicle driven by alternating current motors of the series type by connecting the motors to successive taps on a power transformer, thereby increasing the voltage applied to the motors in a step-by-step manner. Numerous switching schemes have been utilized for performing the tap-changing operations. However, the schemes with which we are familiar are subject to certain inherent defects which have not been entirely overcome by various improvements heretofore proposed. For instance, in some schemes, the vehicle is subjected to sag-backs in the tractive effort of the motors during the tap-changing operations and the switching equipment is subjected to severe surges during the switching operations. Other schemes are so complicated in operation and require so much equipment that the cost of the apparatus and the space required make them impracticable.

Accordingly, an object of our invention, generally stated, is to provide a control system which shall overcome some of the defects of prior tap-changing schemes and which may be economically manufactured and installed.

A more specific object of our invention is to provide a tap-changing system for the propelling motor of an electric vehicle in which no sag-back in tractive effort is encountered during the tap-changing operations.

Another object of our invention is to prevent power surges during the switching operations of a tap-changing control system.

A further object of our invention is to provide a relatively large number of accelerating steps or notches with a relatively small amount of equipment in a tap-changing control system.

Still another object of our invention is to provide a buck-boost tap-changing control system having an equal division of volts per step between each pair of taps regardless of the volts between taps.

A still further object of our invention is to reduce the arcing duty imposed on the tap-changing switches of a tap-changing control system.

Another object of our invention is to provide for operating a plurality of sequence drums in tandem or sequential relation.

Other objects of our invention will be explained fully hereinafter or will be apparent to those skilled in the art.

According to the present invention a plurality of tap-changing switches are utilized for connecting the propelling motor of an electric vehicle to successive taps on a power transformer and a buck-boost transformer is so connected in the motor circuit that no sag-back occurs in the tractive effort when a change is made from one tap to another. The primary winding of the buck-boost transformer is so connected to the common buses for the tap switches by a plurality of buck-boost switches that the voltage between taps is divided into an equal number of steps and the duty imposed on the tap switches during the switching operations is reduced. The operation of the tap switches and the buck-boost switches is controlled by a pair of sequence drums which are operated in sequential relation.

Figure 1B:
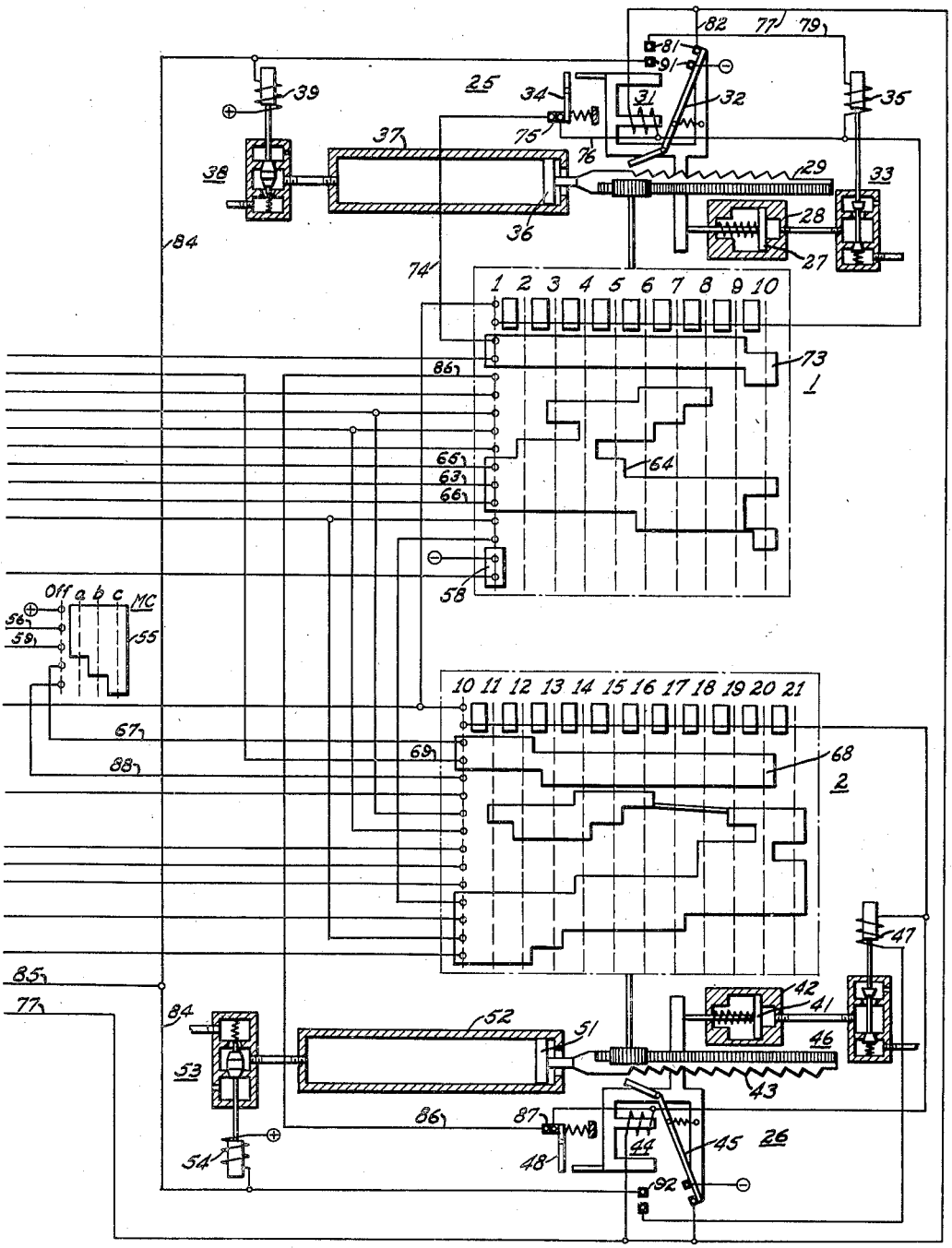

For a fuller understanding of the nature and objects of the invention, reference may be had to the following detailed description, taken in conjunction with the accompanying drawings, in which:

Figures 1A and 1B may be combined to constitute a diagrammatic view of a control system embodying the invention, and Fig. 2 is a chart showing the sequence of operation of a portion of the apparatus shown in Figs. 1A and 1B.

Referring to the drawings, the system shown therein comprises a motor 10 having an armature winding 11 and a series field winding 12 and a main transformer 13 having a primary winding 14 and a secondary winding 15. The main transformer 13 is energized from a trolley conductor 16 through a pantograph collector 17, carried by a vehicle (not shown). The trolley conductor 16 may be connected to any suitable source of power, as a power generating station (not shown).

A plurality of tap switches A0, A1, A2, A3, A4, and A5 are provided for connecting the motor 10 to successive taps on the secondary winding 15 of the transformer 13, thereby increasing the voltage applied to the motor 10 in successive steps in a manner well known in the art. The tap switches A1, A3 and A5 are connected to a common bus B1 and the tap switches A0, A2 and A4 are connected to a common bus B2.

In accordance with the usual practice, the operation of the tap-changing switches is so controlled that no two of the switches which are connected to the same bus can be closed at the same time. However, a preventive coil 18 is connected across the buses B1 and B2, thereby making it possible to close simultaneously tap switches which are connected to a different bus. A motor cutout switch M is provided for disconnecting one terminal of the motor 10 from the transformer winding 15, the other terminal of the motor being connected to a mid-tap 19 on the preventive coil 18 through an auxiliary buck-boost transformer 21.

The auxiliary transformer 21 is provided in order to increase the number of voltage steps applied to the motor 10 during the accelerating period without increasing the number of taps on the main transformer 13. As will be explained more fully hereinafter, the auxiliary transformer 21 is so designed that four equal voltage increments are obtained for each combination of tap-changing switches which are connected to the main transformer 13. In the present case, the ratio of transformation between the primary winding 22 and the secondary winding 23 of transformer 21 is 4 to 1, and a mid-tap 24 is provided on the primary winding 22, thereby making it possible to utilize half of the primary winding, in which case a 2 to 1 ratio is obtained, or the entire winding with a 4 to 1 ratio.

In order to prevent sag-backs in the tractive effort of the motor 10 and also to reduce the arcing duty imposed on the tap-changing switches as a result of power surges encountered during the switching operations, the terminals of the primary winding 22 of the auxiliary transformer 21 are selectively connected to the buses B1 and B2 by a plurality of buck-boost switches BB1, BB2 and BB3. Since the instantaneous polarity of the buses B1 and B2 reverses with each tap switch combination, that is, the polarity with switches A0 and A1 closed is reversed when switches A1 and A2 are closed, and again reverses with A2 and A3 closed, and so on during the entire sequence of operation of the tap switches, it is not necessary to reverse the buck-boost switches at the same instant the tap switch combinations change in order to change the effect of the auxiliary transformer from boosting to bucking.

Furthermore, when only one tap switch is closed during the transition period from one pair of switches to another, the current in each half of the preventive coil 18 is balanced in view of the fact that the transformer 21 has a 2 to 1 ratio at this time, thereby neutralizing the voltage drop in the preventive coil and preventing a decrease in the voltage across the motor at the instant of transition. In this manner, sag-backs in the tractive effort of the motor are prevented.

Also, in view of the fact that the voltage of the auxiliary transformer 21 is at maximum boost just before the transition takes place from one pair of tap switches to another, as, for example, from the position in which switch A0 and A1 are closed to the position in which switches A1 and A2 are closed, all the motor current is being carried by the switch A1 just prior to the transition. Therefore, the switch A0 does not interrupt any motor current when it is opened and neither does the switch A2 carry any motor current at the instant of closure. In this manner, the duty on these switches is materially reduced, since, in previous types of control systems the tap-changing switches were frequently required to close against such heavy currents that they were forced open by the surge currents, which resulted in a severe arcing and burning of the contact members of the switches.

As explained hereinbefore, the buck-boost transformer 21 is so designed that the connections utilized in the present system provide four equal voltage increments for each combination of the tap-changing switches. Thus, when 40 volts are impressed across the buses B1 and B2, as when the switches A0 and A1 are closed or the switches A1 and A2 are closed, the auxiliary transformer gives four 10 volt increments in voltage. Likewise, with 60 volts impressed across the buses B1 and B2, four 15 volt increments are provided and with 80 volts impressed across the buses, four 20 volt increments are provided. In this manner the smaller voltage increments are obtained during the slow speed operation of the motor and the larger voltage increments are obtained during the high speed period of operation.

As previously explained, it is not necessary to reverse the buck-boost switches at the same instant the tap switch combinations change, since the polarity of the buses B1 and B2 reverses with each tap switch combination. Therefore, the effect of the auxiliary transformer 21 changes from a boosting to a bucking effect when the polarity of the buses B1 and B2 is reversed. Thus, as shown in the sequence chart in Fig. 2, with the switches A0 and A1 closed and with the switches BB1, BB2 and BB3 in their lowermost position, a bucking effect of 20 volts is obtained, thereby applying 180 volts on the motor in the particular system illustrated. On the next step, the bucking effect is reduced to 10 volts by actuating the switch BB3 to its uppermost position, which connects the entire primary winding 22 across the buses BB1 and BB2 and changes the ratio of transformation of the auxiliary transformer from a 4 to 1 ratio to a 2 to 1 ratio.

On the following step, the buck-boost transformer has no effect since both terminals of the primary winding are connected to the same bus. On the next step the polarity of the auxiliary transformer is reversed to provide a boosting effect of 10 volts on the motor, and on the following step, the boosting effect is increased to 20 volts since the ratio of transformation of the auxiliary transformer is changed by utilizing the mid-tap 24 in the manner hereinbefore explained.

As shown, the position of the buck-boost switches BB1 and BB2, which govern the polarity of the auxiliary transformer, is not changed when the tap switch A0 is opened and the switch A2 is closed. However, the polarity of the buses B1 and B2 is changed, thereby resulting in a bucking effect of 20 volts by the auxiliary transformer, which is immediately reduced to 10 volts when the switch BB3 is raised to its uppermost position to connect the entire primary winding across the buses B1 and B2.

On the next step, the buck-boost transformer has no effect and on the following step, its polarity is reversed to provide a boosting effect. In this manner the buck-boost switches are carried through a given sequence for one combination of the tap-changing switches and through a reversed sequence for another combination, thereby increasing the applied voltage on the motor in predetermined voltage increments, as shown by the chart in Fig. 2.

The sequence of operation of the tap-changing switches and the buck-boost switches is controlled by a pair of sequence drums 1 and 2 which are driven by notching devices 25 and 26, respectively. The notching device 25 is of the type fully described in Patent No. 1,987,709 issued January 15, 1935 to L. G. Riley. Briefly, the notching device 25 comprises a piston 27 disposed in a cylinder 28, a rack 29 which is geared to the shaft of the sequence drum 1, an electromagnet 31, a trigger 32 actuated by the magnet 31 and an electrically operated fluid valve 33 for controlling the admission of a pressure fluid to the cylinder 28. The electromagnet 31 and the trigger 32 are carried by the piston 27 and the trigger is disposed to engage the rack 29 to advance it one notch for each stroke of the piston 27. A repeater switch 34 is actuated at the end of each stroke to deenergize the electromagnet 31 and an actuating coil 35 of the fluid valve 33, thereby permitting the piston 27 to be returned to its original position in the cylinder 28 in preparation for another notch. A piston 36 is disposed in a cylinder 37 for returning the rack 29 and the drum 1 to its initial position after the completion of the acceleration, as will be more fully explained hereinafter. A fluid valve 38 having an actuating coil 39 is provided for controlling the operation of the piston 36.

The notching device 26 is similar to the device 25 and comprises a piston 41 disposed in a cylinder 42, a rack 43, an electromagnet 44, a trigger 45, a fluid valve 46 having an actuating coil 47, and a repeater switch 48. A piston 51, which is disposed in a cylinder 52, is provided for returning the drum 2 to its initial position. The operation of the piston 51 is controlled by a fluid valve 53 having an actuating coil 54. The fluid valves 38 and 53 are both of the type which admit air to the cylinders when the accelerating coil is deenergized, as shown in the drawing.

The initial operation of the sequence drums may be controlled by a manually operated controller MC, which is of the drum type. In accordance with the usual practice, a limit relay LR is provided for automatically controlling the advancement of the sequence drums in order to maintain the motor current at a predetermined amount during the acceleration of the motor.

In order that the functioning of the foregoing apparatus may be more clearly understood, the operation of the system will now be described in more detail.

Assuming that it is desired to connect the motor 10 to the transformer 13 to accelerate the vehicle driven by the motor, the master controller MC is actuated to position $a$, thereby energizing the actuating coil of the switch M through a circuit which may be traced from positive at the controller MC through a contact segment 55 on the controller, a conductor 56, the actuating coil of the switch M, conductor 57 and a contact segment 58 to a negative at the sequence drum 1. The switch M is closed to complete the low voltage end of the traction motor circuit by connecting one terminal of the motor to one terminal of the secondary winding 15 of the transformer 13.

In position $a$ of the master controller MC the actuating coils of the tap-changing switches A0 and A1 are also energized, thereby closing these switches to complete the high voltage end of the traction motor circuit for the first notch, or switching position. The energizing circuit for the actuating coil of the switch A0 may be traced from positive at the controller MC through the contact segment 55, conductors 59 and 61, an interlock 62 on the switch M, conductor 63, a contact segment 64 on the sequence drum 1, conductor 65 and the actuating coil of the switch A0 to negative. The circuit for the actuating coil for the switch A1 extends from the contact segment 64 on the sequence drum 1 through a conductor 66 and the actuating coil of the switch A1 to negative.

The acceleration is continued by moving the master controller MC to position $b$ which starts the No. 1 sequence drum advancing by the operation of the piston 27. The energization of the actuating coil 35 of the fluid valve 33, which controls the piston 27 as hereinbefore explained, takes place through a circuit established by the trigger 32. The trigger 32 is actuated by the electromagnet 31, which is energized through a circuit that may be traced from positive at the controller MC through the contact segment 55, a conductor 67, a contact segment 68 on the sequence drum 2, conductor 69, contact members 71 of the limit relay LR, conductor 72, a contact segment 73 on the sequence drum 1, conductor 74, contact members 75 on the repeater switch 34, conductor 76, the energizing coil of the electromagnet 31, a conductor 77, and an interlock 78 on the switch M to negative. The operation of the trigger 32 completes the energizing circuit for the actuating coil 35 of the fluid valve 33 through a circuit which extends from the conductor 76 through the coil 35, a conductor 79, contact members 81 carried by the trigger 32, conductors 82 and 77 to negative through the interlock 78 on the switch M.

It will be noted that a holding circuit is established for the actuating coil of the switch M through a conductor 83 and the interlock 78, thereby maintaining the switch M in the closed position after the sequence drum 1 advances from its first position. Furthermore, the actuating coils 39 and 54 of the fluid valves 38 and 53, respectively are both energized at this time through conductors 84 and 85 and the interlock 78 on the switch M. In this manner the fluid pressure is removed from the cylinders 37 and 52 to permit the notching devices 25 and 26 to advance the sequence drums 1 and 2.

The No. 1 sequence drum advances notch by notch in the manner described in Patent No. 1,987,709 under the control of the limit relay LR which is operated to interrupt the energizing circuit for the electromagnet 31 and the actuating coil 35 of the magnet valve 33 when the motor current exceeds a predetermined value. This interruption causes the sequence drum to stop until the limit relay drops as a result of the decrease in the motor current. When the relay drops, the progression continues until the relay again lifts. Under normal conditions, the progression is one notch at a time with the relay lifting on each notch. During this time the No. 2 sequence drum remains in its initial or 10' position.

As the No. 1 sequence drum advances, the buck-boost switches and also the tap-changing switches are operated in the order shown in the chart in Fig. 2, thereby increasing the voltage applied to the motor as fully explained hereinbefore and as also indicated in the chart, Fig. 2. It will be understood, of course, that the potential values given are merely illustrative and that other values of potential may be obtained by changing the design of the main transformer 13 and the auxiliary transformer 21.

When the No. 1 sequence drum reaches position 10, the contact finger to which the conductor 74 is connected, disengages contact segment 73, thereby deenergizing the trigger magnet 31 and the magnet valve 33 and stopping the progression of No. 1 sequence drum. At the same time a conductor 86 is energized since the contact finger to which it is connected engages the contact segment 73. In this manner the electromagnet 44 is energized through contact member 87 on the repeater switch 48, and the trigger 45 is actuated to energize the coil 47 of the magnet valve 46. The energization of the magnet valve 46 causes the No. 2 sequence drum to advance under the control of the limit relay LR in the same manner as the No. 1 drum, which remains on position 10 during movement of the No. 2 sequence drum.

When the No. 2 sequence drum reaches position 13, the contact finger to which conductor 67 is connected disengages the contact segment 68, thereby deenergizing the trigger magnet 44 and the magnet valve 46 which stops the progression of the No. 2 sequence drum. As shown in the chart in Fig. 2, the tap switches A2 and A3 are closed on step 13, which is the slow speed running connection for the motor 10.

If it is desired to advance to the high speed connection, the master controller MC is moved to position c. When the controller MC is moved to position c a conductor 88 is energized, which, in turn, energizes the conductor 69 through the contact segment 68 and the progression of the No. 2 sequence drum continues to position 21 in the manner hereinbefore described. The advancement of the No. 2 sequence drum causes the operation of the tap changing switches A3, A4 and A5 and the buck-boost switches BB1, BB2 and BB3 in the order shown in the chart in Fig. 2, thereby increasing the voltage on the motor 10 to its maximum value in successive steps, as indicated in the chart.

To shut off power from the motor, the controller MC is returned to the "off" position, deenergizing the conductors 56, 59, 67 and 88, thereby opening the switch M and the tap changing switches to interrupt the traction motor circuit. The opening of the interlock 78 on the switch M deenergizes the actuating coils 39 and 54 of the magnet valves 38 and 53, respectively, which admit fluid pressure to the cylinders 37 and 52, thereby returning both the No. 1 and the No. 2 sequence drums to their initial positions.

However, it will be noted that a parallel circuit for the magnet coils 39 and 54 is maintained through contact members 91 and 92 on the triggers 32 and 45, respectively, which remain closed until the notching devices 25 and 26 have completed any stroke which might be in progress at the time of shutting off power. In this manner fluid pressure cannot be admitted to the cylinders 37 and 52 until the completion of such strokes, thereby preventing the possibility of the pistons 36 and 51 opposing the action of the pistons 27 and 41, respectively. After the sequence drums have returned to their initial positions, power may be reapplied to the motor by operating the master controller in the manner hereinbefore described.

From the foregoing description it is apparent that we have provided a tap-changing control system which is suitable for controlling the operation of the traction motors of railway vehicles and which eliminates some of the difficulties encountered with control systems of the types previously utilized. The present system provides for accelerating the motors without sag-backs in the tractive effort and without power surges during the switch operations, thereby reducing the duty imposed on the switching equipment. Furthermore, the present system provides a relatively large number of notches or steps during the accelerating period with a relatively small amount of switching equipment, thereby reducing the cost of the equipment, as well as the space required for housing the equipment in locomotives or other vehicles.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

We claim as our invention:

1. In a control system, in combination, a main transformer, a plurality of switches for changing taps on said transformer to vary the voltage on a power circuit, a pair of power buses to which alternate ones of said tap-changing switches are connected, an auxiliary transformer having its secondary winding connected in the power circuit and its primary winding energized from said power buses, and means for changing the ratio of transformation of said auxiliary transformer.

2. In a control system, in combination, a main transformer, a plurality of switches for changing taps on said transformer to vary the voltage on a power circuit, a part of said tap switches being connected to one common bus and the remainder of said tap switches being connected to another common bus, a preventive coil connected across said common buses and in the power circuit, an auxiliary transformer having its secondary winding connected in the power circuit and its primary winding energized from said common buses, and means for changing the ratio of transformation of said auxiliary transformer.

3. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, said primary winding being energized from said common buses, and switching means for changing the ratio of transformation of said auxiliary transformer.

4. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected in the motor circuit, said primary winding being energized from said common buses, a mid-tap on said primary winding, and switching means for selectively connecting the terminals and said mid-tap of said primary winding to said common buses.

5. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected to the motor, a mid-tap on said primary winding, switching means for so connecting said primary winding to said common buses that the auxiliary transformer alternately bucks and boosts the voltage applied to the motor, and additional switching means for utilizing said mid-tap to change the ratio of transformation of said auxiliary transformer.

6. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected to the motor, said primary winding being energized from said common buses, switching means for interchanging the connections of said primary winding to said buses, whereby said auxiliary transformer alternately bucks and boosts the voltage applied to the motor, and additional switching means for changing the ratio of transformation of said auxiliary transformer.

7. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected to the motor, said primary winding being energized from said common buses, switching means for interchanging the connections of said primary winding to said buses, whereby said auxiliary transformer alternately bucks and boosts the voltage applied to the motor, and a pair of sequence drums for controlling the operation of said tap switches and said switching means.

8. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected to the motor, said primary winding being energized from said common buses, switching means for interchanging the connections of said primary winding to said buses, whereby said auxiliary transformer alternately bucks and boosts the voltage applied to the motor, a pair of sequence drums for controlling the operation of said tap switches and said switching means, and notching means for operating said sequence drums in sequential relation in a step-by-step manner.

9. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the midpoint of said preventive coil and the other terminal connected to the motor, said primary winding having a mid-tap, and a plurality of buck-boost switches for selectively connecting the outer terminals and the mid-tap on said primary winding to said common buses.

10. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected to the motor, said primary winding having a mid-tap, a plurality of buck-boost switches for selectively connecting the outer terminals and the mid-tap on said primary winding to said common buses, and a pair of sequence drums for controlling the operation of said tap switches and said buck-boost switches.

11. In a control system, in combination, a main transformer, a motor energized from said transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected to the motor, said primary winding having a mid-tap, a plurality of buck-boost switches for selectively connecting the outer terminals and the mid-tap on said primary winding to said common buses, a pair of sequence drums for controlling the operation of said tap switches and said buck-boost switches, and fluid-pressure operated notching devices for operating said sequence drums in sequential relation in a step-by-step manner.

12. In a control system, in combination, a main transformer, a plurality of switches for changing taps on said transformer to vary the voltage on the motor, a part of said tap switches being connected to one common bus and the remainder of said tap switches being connected to another common bus, a preventive coil connected across said common buses, an auxiliary transformer having a primary winding and a secondary winding, said secondary winding having one terminal connected to the mid-point of said preventive coil and the other terminal connected to the motor, said primary winding having a mid-tap, a plurality of buck-boost switches for selectively connecting the outer terminals and the mid-tap on said primary winding to said common buses, a pair of sequence drums for controlling the operation of said tap switches and said buck-boost switches, a pair of notching devices for operating said sequence drums in sequential relation, and means on the first of said sequence drums for controlling the operation of the second drum.

LLOYD J. HIBBARD.
THELBERT L. WEYBREW.